(12) United States Patent
Steinrück et al.

(10) Patent No.: US 6,318,147 B1
(45) Date of Patent: Nov. 20, 2001

(54) WEAR MONITOR

(75) Inventors: Peter Steinrück, Hallstadt; Franz Seifert; Wolfgang Zeppelzauer, both of Vienna; Alfred Pohl, Mistelbach, all of (AT)

(73) Assignee: Hoerbiger Ventilwerke GmbH, Vienna (AT)

(*) Notice: Subject to any disclaimer, the term of this patent is extended or adjusted under 35 U.S.C. 154(b) by 0 days.

(21) Appl. No.: 09/358,556

(22) Filed: Jul. 22, 1999

(30) Foreign Application Priority Data

Jul. 31, 1998 (AT) .................................................. 1322/98

(51) Int. Cl.$^7$ ................................................ G01N 3/56
(52) U.S. Cl. .................... 73/7; 73/120; 73/593; 92/5 R
(58) Field of Search .................. 73/7, 120, 593; 92/5 R (56) References Cited

U.S. PATENT DOCUMENTS

| | | | |
|---|---|---|---|
| 4,143,319 | * | 3/1979 | Rouam .................................. 73/7 X |
| 4,375,761 | * | 3/1983 | Pywell ..................................... 73/7 |
| 4,884,434 | * | 12/1989 | Satake et al. .......................... 73/7 |
| 4,987,774 | * | 1/1991 | De Waal ............................... 73/120 |
| 5,151,695 | * | 9/1992 | Rollwitz et al. ................. 340/870.33 |
| 6,084,503 | * | 7/2000 | Ruile et al. ..................... 340/870.16 |
| 6,144,332 | * | 11/2000 | Reindl et al. .......................... 342/42 |

FOREIGN PATENT DOCUMENTS

| | | | | |
|---|---|---|---|---|
| 538771 A1 | * | 4/1993 | (EP) . | |
| 4-124444 | * | 4/1992 | (JP) . | |
| 62-151703 | * | 7/1987 | (JP) | ......................................... 73/7 |
| 1-110207 | * | 4/1989 | (JP) | ......................................... 73/7 |
| 3-59436 | * | 3/1991 | (JP) | ......................................... 73/7 |
| 3-215701 | * | 7/1991 | (JP) | ......................................... 73/7 |
| 4-76439 | * | 3/1992 | (JP) | ......................................... 73/7 |

\* cited by examiner

*Primary Examiner*—Thomas P. Noland
(74) *Attorney, Agent, or Firm*—Dykema Gossett PLLC (57) ABSTRACT

A wear monitor suitable in particular for monitoring the wear and tear of rider rings (7) on the pistons (5) of horizontally operating reciprocating compressors presents a sensor (9) that monitors the thickness of the rider ring (7) at least indirectly, is arranged in the area of the rider ring (7) in such a way as to move together with it and can be interrogated without contact via a motionless interrogation unit (16), which communicates with an evaluation unit (18). The sensor (9) preferably presents a passive surface acoustic wave element (23), whose electromagnetic reflection behavior depends on the thickness of the rider ring (7) consequent upon the degree of wear and tear thereof and which communicates with a sensor antenna (19) moving together with it, while the interrogation unit (16) presents a communicating interrogation antenna (20).

8 Claims, 4 Drawing Sheets

PRIOR ART

WEAR MONITOR

BACKGROUND OF THE INVENTION

1. Field of the Invention

The invention concerns a wear monitor for controlling the wear and tear of a component that moves with a rubbing motion while pressed against a motionless surface, in particular for controlling the wear and tear of rider rings, piston rings and suchlike, with a sensor that monitors the thickness of the moving component at least indirectly and communicates with an evaluation unit.

2. The Prior Art

Arrangements of the above-named kind are known in all sorts of connections and are mostly applied for the purpose of being able to keep the eroding component in use for example as a guiding element, an insulating element, a braking element or suchlike as long as possible (in other words as far as an at least factually objective given wear threshold), in order to keep the downtime usually necessary for replacing the eroded component as short as possible in relation to rest of the serviceable life of the equipment. In the majority of the cases of application employed as examples, a direct, for example visual, check of the wear and tear is actually only possible otherwise by stopping the equipment and usually dismantling it at least in part, which procedure of inspection to be carried out for the sake of caution however often involves unacceptable downtimes.

In connection with the wear monitoring of piston rings and suchlike, which is in particular demand, the underlying problem can be expressed for example in relation to piston compressors as follows: especially when the piston is not set vertically and in larger machinery, the weight of the piston is usually supported at present by the cylinder liner, via slideways. For this purpose, the cylinder is usually fitted with rider rings, which in lubricated compressors consist of metal materials, preferably soft metal alloys, or of plastics, which slide on a film of grease. In the case of non-lubricated reciprocating piston compressors, practically exclusive use is made of rider rings made of non-metallic materials (especially plastics) with particularly favourable tribological properties, although these are of course subject to a certain degree of wear and tear. In order to avoid damage to the cylinder liner or to the pistons themselves, these rider rings may only be used until they have a given residual thickness, at which point they must be replaced. In order to determine the moment when replacement is necessary, it is therefore important to know the residual thickness of the rider rings at any given time. In order to avoid switching the compressor off unnecessarily, it is desirable to be able to determine the wear and tear of the rider rings without dismantling the compressor cylinder, preferably while the compressor is running.

As the measurement of the residual thickness of the component subject to wear and tear—as for example the above-described rider rings inside the cylinder of a piston compressor—is, as indicated, only possible with difficulty and in any case against considerable expenditure, because of the conditions under which the relative equipment is normally used, a variety of procedures and systems have been known to be used to date for determining indirectly the condition of wear and tear of the component in question. Thus for example, in the case of the reciprocating piston compressor described above, an apparatus known from U.S. Pat. No. 4,987,774 A makes an indirect determination of the residual thickness of the rider rings based on the vertical position of the piston rod. The measurement of the drop of the piston rod is determined, for example, using an inductive transducer situated in a position that is easily accessible from outside, e.g. on the side of the piston rod packing facing the crank-case. The problem arising here is of course that the distance measured between the sensor and the piston rod is influenced by countless factors. In addition to the thickness of the rider ring that is actually of interest, the vertical position of the cross-head of the compressor, the deflection of the piston rod, the vertical play of the piston in the cylinder and the distance between the point of measurement and the rider ring also play a rôle that is ultimately difficult to consider accurately. Moreover, the result of the measurement is further influenced by tolerances, geometric relationships, momentary crank angle positions as well as deformations as a consequence of forces exerted. In order to eliminate these disturbing influences, provision was already made in the said known apparatus for determining the piston rod drop at regular intervals with a suitably selected crank angle, which eliminates many of the effects mentioned that distort the measurement result, so that the wear and tear of the rider rings can be determined so as to achieve a relatively favourable approximation. For this purpose, it is of course necessary to synchronise the measurement with the machine speed, for which the signal from an additional transducer applied on the disc flywheel or on another suitable position on the crank mechanism is used.

In order to avoid the additional installation expense for a speed sensor or angular encoder of this kind, it has also been proposed to acquire the course over time of the piston rod drop over the piston stroke and to deduce the wear and tear of the rider rings by suitable mathematical evaluation by omitting a speed-synchronous signal.

Both aforementioned methods embody a further disadvantage of the inductive measurement of the piston rod drop in the form of its sensitivity to the magnetic properties of the piston rod, because the same is often provided with a layer whose purpose is to inhibit wear and tear. These layers sometimes have irregular wall thicknesses and often also comprise diamagnetic properties, so that the determination of the piston rod drop in this way may also include principal errors.

Furthermore, according to EP 538 771 A1, for example, a procedure for diagnosing the wear and tear in moving machine parts was proposed, whereby, in connection with the measurement of the wear and tear taking place in rider rings of piston compressors functioning horizontally, the drop of the piston rod is determined by means of a pneumatic transducer functioning on the basis of the nozzle-baffle principle, thus avoiding the above-mentioned difficulties with the inductive measuring methods. The other described disadvantages of this kind of determination of the wear and tear, however, remain also in this case.

In order to further improve the aforementioned methods for monitoring the wear and tear of the rider rings in piston compressors in particular, systems have also been proposed in which the drop of the piston rod is measured simultaneously in two different positions, whereby the influence of the vertical position of the piston cross-head can be eliminated with knowledge of the current crank angle and suitable evaluation. Nevertheless, it has proved to be impossible to demonstrate these theoretical advantages in practice, as the measurement errors in the two measurements interfere with each other adversely.

The task of the invention is to improve a wear monitor of the kind described above in such a way that the mentioned disadvantages of the known arrangements and procedures are avoided and in particular that it is possible to obtain a significant statement of the determination of the residual thickness of the moving components, such as the said rider rings of piston compressors, in a simple way.

SUMMARY OF THE INVENTION

In the case of a wear monitor of the kind described above, this task is fulfilled according to the invention in that the sensor is applied in the area of the moving component and can be interrogated without contact by means of an interrogation unit connected to the evaluation unit. Thus the sensor monitoring the thickness of the moving component can now be applied for example in the immediate vicinity of the said moving component, on the said moving component itself or on a support moving together with the said moving component, which excludes the above-mentioned geometric disturbance factors found in the known monitoring methods right from the beginning. The interrogation unit, which can be situated anywhere externally in a protected manner, can then interrogate the sensor either continuously or almost continuously, or for example also periodically, on the occasion of given crank angle positions, whereby there is always a wear signal available that no longer requires any complex corrections.

Although in principle every suitable thickness sensor that can be interrogated without contact can be considered as the sensor in the said connection, one particularly preferred embodiment of the invention has proved to be very advantageous, according to which the sensor has a passive surface acoustic wave element, whose electromagnetic reflection behaviour depends on the thickness of the moving component depending on the wear and tear of the same and which communicates with a sensor antenna moving with it, whereby the interrogation unit is fitted with an interrogation antenna related thereto. Surface acoustic wave elements are known elements of micro-electronics, which for example according to WO 93/13495 can also take the form of sensors for determining and transmitting all sorts of measurement values. In this case, the piezo-electric effect is used to stimulate acoustic surface waves electrically and to reconvert these into electric alternating voltages. For this purpose, reciprocally interlacing strip conductors, so-called interdigital transformers, are normally applied to a piezo-electric substratum. One of these interdigital transformers is connected electrically to an antenna, in which a high frequency impulse is fed by wireless means via an interrogation antenna. In this way, the HF signal is converted by the piezo-electric effect in this interdigital transformer into an acoustic surface wave, which spreads out on the substratum in the form of two diverging partial waves. These two partial waves can be reconverted into HF signals via the reversed piezo effect in further interdigital transformers applied independently of each other on the substratum or may be reflected to the feed interdigital transformer, whereby various further factors influencing the substratum (mechanical load, temperature, . . . ) act upon the propagation time of the acoustic waves and information about these influences bearing locally upon the substratum can thus be obtained lastly from the response signals or the delay therein re-transmitted via one of the further interdigital transformers or also via the feed interdigital transformer.

Furthermore, in this connection, a sensor that can be interrogated by radio is known to surface wave technology for example from WO 96/33423 A1, in which at least one of the further interdigital transformers is combined with an impedance as a sensitive element, which is connected electrically with the said interdigital transformer as a moving load. The dimension of the said external impedance is altered by the measured dimension, thereby determining the acoustic reflection behaviour of the interdigital transformer connected thereto. In particular, for example, an interdigital transformer short-circuited across the external impedance only reflects the acoustic surface wave minimally. With various constructions of this impedance functioning as a sensor, it is possible to undertake all sorts of measurement and monitoring tasks, among which for example capacitative displacement/position sensors, humidity sensors, inductive displacement/position transducers and suchlike are mentioned in the above-named text.

One further particularly preferred embodiment of the invention is advantageous for monitoring wear and tear of plastic rider rings in the pistons of reciprocating compressors (especially horizontal reciprocating compressors), according to which the interrogation antenna is arranged on the inner cylinder wall or liner of the cylinder chamber and connected via pressure-tight links to the interrogation and evaluation unit, whereby the sensor antenna of the surface acoustic wave element is preferably situated on the piston in such a way that the movement of the piston brings it into the immediate vicinity of the interrogation antenna at regular intervals. This results in a very simple arrangement, which favours the measurement and the transmission of the measurement values at a given position (for example at one of the dead centres of the piston's movement) right from the start via the mutual positioning of the two antennas. As this naturally brings the two antennas into very close proximity, even small signals are already sufficient to enable the monitoring to be carried out with certainty, undisturbed by external influences. Instead of the said radio transmission via antennas, the wireless signal could of course also be transmitted in the known way via capacitative or inductive coupling.

In a further preferred embodiment of the invention, the sensor can have a wear element applied to the piston, preferably on its under side, independent of the rider ring and in its vicinity, whose degree of erodability is equal to or slightly more than that of the rider ring and whose radial thickness can be interrogated through the surface acoustic wave element and the interrogation and evaluation unit. This embodiment is particularly advantageous because rider rings of this kind are often arranged on the piston (at least in channels), with respect to which they are free to turn, so that it would only be possible to be certain of aligning the two antennas in such a way that they will remain reciprocally stable by applying additional measures if the surface acoustic wave element together with the sensor antenna were applied to the said rider ring itself. Furthermore, this solution also offers advantages with respect to the production of rider rings, in that it does not require the inclusion of a piezo-electric substratum for the surface acoustic wave element. The size of the said surface acoustic wave element and of the relative sensor antenna is also no criterion, as these elements are applied to the separate wear element in the vicinity of the rider ring.

In a further preferred improvement of the invention, this separate wear element can form the insulator for a plate capacitor linked with a reflection interdigital transformer of the surface acoustic wave element; the plate of the plate capacitor is formed by the piston or a conducting electrode of the wear element, while the other plate is formed by the conducting inner cylinder liner or cylinder wall and the capacity determined by the distance between the two plates supplies the sensor signal via the surface acoustic wave element. This results in a simple, robust embodiment of the above-mentioned conclusion of the reflection interdigital transformer, which alters directly, independent of the residual thickness of the rider ring being monitored for wear and tear, in such a way that the said wear and tear is easy to determine in the response signal of the surface acoustic wave element.

One particularly preferred embodiment of the invention in connection with the latest form mentioned is that according to which the capacity of the plate capacitor together with the inductance of its connecting wires (to the interdigital transformer) create an impedance in the vicinity of the serial resonance in question for the reflection interdigital transformer. This substantially achieves the short circuit already mentioned above of the reflection interdigital transformer that only reflects the acoustic surface wave minimally, as long as the impedance does not change as a consequence of continuing wear and tear. In the vicinity of the resonance, this embodiment presents a very sensitive low-potential circuit for changing the impedance, whereby the very steep impedance alteration in the vicinity of the serial resonance is brought into play for measuring the wear and tear process.

In a further embodiment of the invention, the wear element may however also present a resistance that changes with the reducing thickness and/or a correspondingly changing inductance, which are related to the reflection interdigital transformer of the surface acoustic wave element. Unlike the above-described embodiment with the resonance circuit, however, this embodiment, which is very advantageous for a variety of applications, does not produce any absolute minimal reflection, so the resolution of the measured dimensions becomes correspondingly smaller. If the said inductance is combined for example with a constant capacity to create an oscillating circuit, however, the relative said advantages can be obtained once again.

In a further preferred embodiment of the invention, the sensor can present a sliding block with negligible wear and tear against the rider ring, applied to the piston, independent of the said rider ring and in its vicinity, which is pressed elastically against the inner wall of the cylinder and acts mechanically on the surface acoustic wave element. In this way, the independence of the acoustic surface wave spreading out on the substratum from being influenced mechanically by said substratum, for example by a distortion of the substratum fixed at one end, can be exploited to obtain the actual sensor signal, resulting in a very robust arrangement insensitive to disturbance.

According to a further preferred embodiment of the invention, however, in addition to the reflection interdigital transformer influenced by the thickness of the moving element, the surface acoustic wave element can also present at least one further reflection interdigital transformer whose acoustic reflection behaves independently of the thickness of the moving component, with which it is possible for example to compensate for the temperature-dependence of the actual wear monitoring process by means of the temperature-dependence of this reflection, or to undertake separate measurements, for example of the temperature or level of humidity.

BRIEF DESCRIPTION OF THE DRAWINGS

The invention is now described in greater detail with the aid of the examples of embodiment represented schematically in the drawings.

DETAILED DESCRIPTION OF THE DRAWINGS

Figure 1:
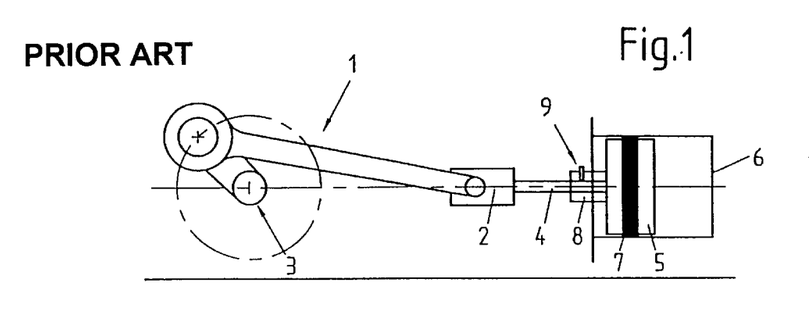
FIG. 1 illustrates a sketch of the state of the art with respect to monitoring the wear and tear of rider rings in reciprocating compressors.

Illustrating the state of the art, FIG. 1 provides a schematic rendering of a part of a horizontally operating compressor. The rotating motion of the crankshaft 3 is converted by the crank arm 1 and the cross-head 2 into a reciprocating movement of the piston rod 4 together with the piston 5, whereby the latter, operating together with the cylinder 6 (and the inlet and outlet valves not illustrated here) pumps the medium delivered through an inlet tube, also not illustrated here, in compressed form into an outlet tube, which is also not illustrated here. The support of the piston 5 relative to the cylinder 6, normally also equipped with the piston rings (not illustrated) that produce the sealing in cylinder 6, is provided here by a rider ring 7 situated at the mid-point of the piston 5, which rider ring 7 in the case of a compressor operating without lubrication normally consists of a non-metallic material with particularly favourable sliding properties (various plastics) and is therefore subjected to a certain degree of wear and tear during operation. In order to be able to source information about the state of wear of the rider ring 7 while the compressor is running and without opening the cylinder 6, in the area of the pressure packing 8 at the point where the piston rod 4 penetrates into the cylinder 6, a sensor 9 is fitted which monitors the drop of the piston rod 4 relative to the cylinder 6, for example inductively, and transmits it to an evaluation unit not further represented here. As soon as the signal from sensor 9 indicates an at least empirically determined threshold drop of the piston rod 4, after which the rider ring 7 can no longer securely prevent the contact between the piston 5 and the interior wall of the cylinder 6, the compressor can be stopped and the rider ring 7 can be replaced after the necessary partial disassembly.

As a consequence of the guidance of the piston 5 in the cylinder 6 and of the cross-head 2 on its guides, not illustrated here, as well as of the arrangement of the sensor 9 variably distanced from the rider ring 7 during the functioning of the compressor, difficulties may arise in attributing the signal from the sensor 9 to the actual wear and tear suffered by the rider ring 7 of the kind already described above, which ultimately usually lead to the rider ring 7 already being replaced for security reasons although its actual degree of wear and tear would not yet require this step.

Figure 2:
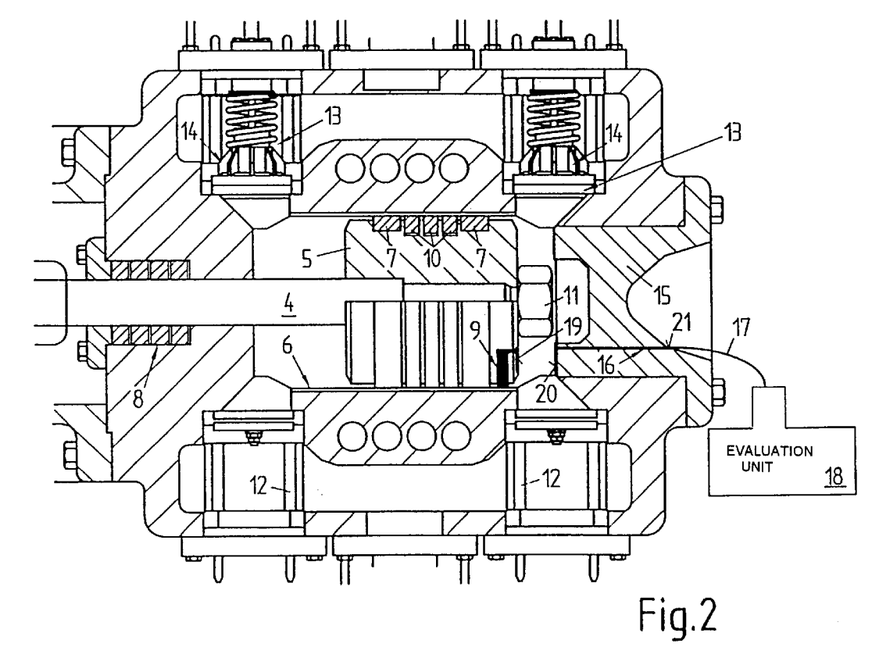
FIG. 2 shows a partial cross-section in the area of the cylinder of a horizontally working reciprocating compressor with a wear monitor according to the invention.

In FIG. 2, only the right-hand area of a piston compressor equipped according to the invention according to FIG. 1 is represented in somewhat greater detail. Here, the piston 5 is supported by two externally disposed rider rings 7 against the internal wall of the cylinder 6, whereby three separate piston rings 10 are indicated between the two rider rings 7. The piston 5 is fixed by a nut 11 to the piston rod 4, which is withdrawn outwards through the seal packing 8 and—in a manner not illustrated here—driven by a piston crosshead, as illustrated in FIG. 1. In addition, there are discharge valves 12 affixed to both sides and suction valves 13, also affixed to both sides, which, as is standard practice in compressors of this kind, are constructed in such a way as to be automatic, whereby the suction valves 13 in the embodiment illustrated are equipped with unloaders 14 that enable the compressor's pump capacity to be adjusted in a manner that is known and of no further interest here.

The sensor 9 for indirectly monitoring the wear and tear of the rider rings 7 is here only applied on the side of the cover 15 of the cylinder 6 in the area of the rider ring 7 in such a way as to to move with it and can be interrogated without contact, via an interrogation unit 16 arranged motionless in the area of the cover 15, which communicates with an evaluation unit 18 by a cable 17. In addition, the sensor 9 presents a passive surface acoustic wave element in a manner described in greater detail in FIGS. 3 to 8, whose electromagnetic reflection behaviour depends on the thickness of the rider rings 7 consequent upon the wear and tear of the same and which communicates with a sensor antenna 19 moving together with it. The interrogation unit 16 presents an interrogation antenna 20 connected to it, which is situated on the inner cylinder wall or liner of the cylinder chamber 6 of the compressor and communicates with the interrogation and evaluation unit 18 via pressure-tight connections 21. The sensor antenna 19 is situated on the piston 5 in such a way that it comes into the vicinity of the interrogation antenna 20 periodically with the movement of the piston—here in the area of the upper dead centre of the piston 5.

Figure 3:
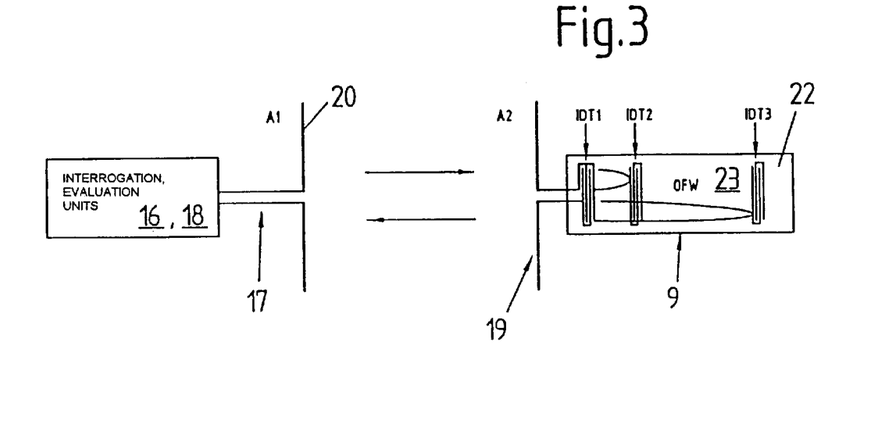
FIG. 3 shows the main arrangement of a passive surface acoustic wave element as a sensor that can be interrogated without being touched.
Figure 4:
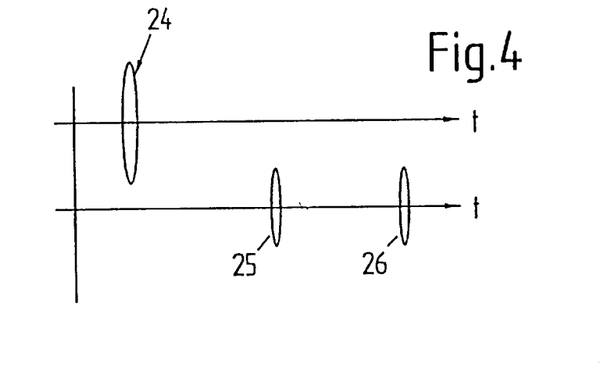
FIG. 4 provides a schematic rendering of interrogation and response impulse in an arrangement according to FIG. 3.
Figure 5:
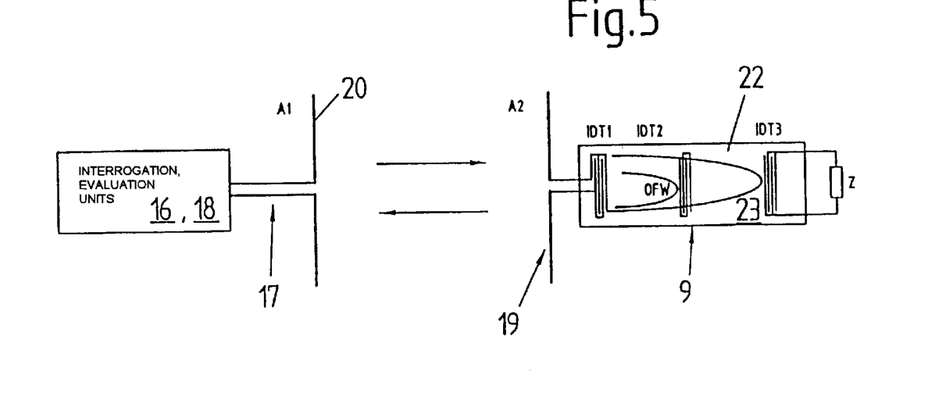
FIG. 5 shows, in an illustration complying with FIG. 3, an embodiment in which one of the reflection interdigital transformers forms a serial oscillating circuit with an externally situated impedance, and FIGS. 6 to 9 provide an enlarged and partly sectioned rendering of embodiments of a wear monitor according to the invention on a reciprocating piston compressor according to FIG. 2.

The function of the sensor 9 in FIG. 2 and how it is interrogated are described in greater detail hereunder with the aid of FIGS. 3 to 5:

On a piezo-electric substratum, a known surface acoustic wave element 23 is formed by arranging interdigital transformers (IDT 1–IDT 3) as reciprocally interlacing strip conductors, of which here IDT 1 is connected electrically with the sensor antenna 19. A high frequency impulse, indicated in FIG. 4 as 24, is transmitted from the interrogation antenna 20 of the interrogation unit 16 via the cable 17. This high frequency impulse is fed into the sensor antenna 19 without contact and then converted into an acoustic surface wave through IDT 1 by the piezo-electric effect of the substratum. Said acoustic surface wave then spreads out on the substratum 22 in the form of two diverging partial waves, whereby the wave diverging leftwards at the edge of the substratum 22 is dissipated in an absorber that is not further illustrated here. The partial wave diverging rightwards is reflected as an acoustic surface wave at each of the further IDT 2, IDT 3, . . . (provision could also be made for more) applied, as the acoustic surface wave is first reconverted into an HF signal (because of the reversed piezo-effect) in these IDT's, and the reflection wave is then stimulated again because of the normal piezo-effect. The reflected partial waves are reconverted into HF impulses after the relative acoustic propagation time of a few microseconds in the IDT and then re-transmitted via the sensor antenna 19 to the interrogation antenna 20—the relative impulses are indicated in FIG. 4 as 25 and 26.

If the substratum 22 is now influenced, for example by the effect of heat or mechanical deformation brought about by external forces, this alters the propagation properties of the surface waves. The element 23 can thus be used directly as sensor 9, as the propagation time of the surface waves between the IDT's is determined in the interrogation unit 16 or the evaluation unit 18. Thus for example temperature, deformation and all those physical influences that can be converted into such dimensions can be measured on sensor 9 without using any cables, which requires no further source of energy in addition to the interrogation signal arriving by radio, and supplied in a wide range of reproducible temperature and pressure results. Already in this simple form, the sensor 9 could thus be employed in an embodiment according to FIG. 2 for monitoring the wear and tear in the rider rings 7, as the substratum 22 is arranged on the piston 5 in such a way, for example, that it is deformed mechanically as the thickness of the rider ring 7 decreases (either directly or indirectly, via a lever deviation or suchlike), which can be monitored or interrogated without contact in the manner described.

Figure 6:
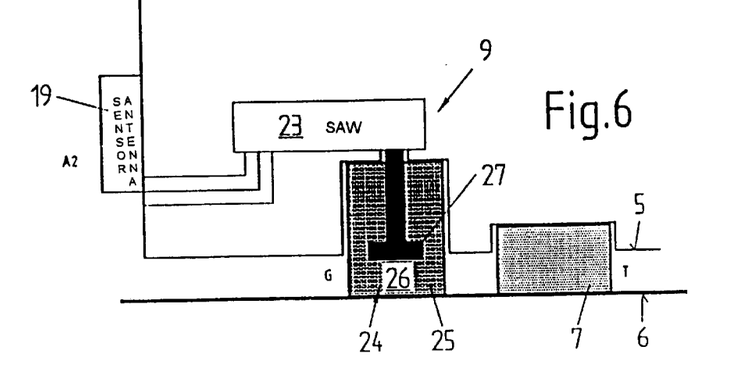

In the embodiment according to FIG. 5, unlike that in FIG. 3, the IDT 3 (although it could also be IDT 2 or another IDT) is now connected to an external terminating impedance Z, which determines the acoustic reflection behaviour of the said IDT 3 and is influenced by the wear and tear suffered by the rider ring for example in the manner illustrated in FIG. 6. If a radio transmitted surface wave impulse is stimulated again via the interrogation antenna 20 via IDT 1, reflected in the manner described at IDT 3 and transmitted back to the interrogation unit 16 as an HF impulse, the amplitude and phase relationships of the response signal between IDT 1 and IDT 3 delayed by the double propagation time of the surface wave are altered here regardless of the terminating impedance Z. In particular, for example, a short-circuited IDT 3 only reflects the surface wave minimally. A short circuit of the said IDT 3 may be achieved for example in that the terminating impedance Z forms a resonant serial oscillating circuit together with the connection inductances and the parasitic capacities. In the vicinity of the serial resonance, the terminating impedance Z in connection with the surface wave delay stretch represents a highly sensitive low potential circuit for alterations in Z. Apart from this, instead of the construction of the serial ringing circuit with the terminating impedance Z at IDT 3, it would also be possible to connect an ohm resistance that alters with the wear and tear suffered by the rider ring 7 or a similarly altering inductance (see also FIGS. 7 and 8), whereby however, unlike in the case of the construction with the resonance circuit, no absolute reflection minimum can be achieved at IDT 3 (unless the resonance conditions are satisfied with additional measures) and the resolution of the measured dimension becomes correspondingly smaller.

FIG. 6 illustrates one possibility for approaching the above-described series resonance by means of the corresponding construction of the sensor 9. Here the said sensor 9 presents a wear element 24, positioned independently of the rider ring 7 and in proximity to it on the piston 5, preferably on its under side, whose degree of erodability is equal to or slightly more than that of the said rider ring 7 and whose radial thickness can be interrogated through the surface acoustic wave element 23 and the interrogation and evaluation unit not illustrated here. For this purpose, the wear element, in its area facing the wall of the cylinder 6, constitutes the insulator 25 of a plate capacitor 26 connected with the reflection interdigital transformer (IDT 3 in FIG. 5) of the surface acoustic wave element, such that the plate 27 of the said plate capacitor 26 on the side of the piston is formed here by a separately conducting electrode of the wear element 24, while the other plate is formed here by the conducting inner metallic limit of the cylinder 6. With a corresponding embodiment of the wear element 24, the plate 27 on the side of the piston could, however, also be formed by the piston itself, for example, or by a coating of the wear element 24 at its extremity on the side of the piston. The capacity of the plate capacitor 26 determined by the distance between the two plates and thus by the wear and tear suffered by the neighbouring rider ring 7 therefore furnishes the sensor signal via the surface acoustic wave element 23. As described, this capacity of the plate capacitor 26 can be arranged in such a way that, together with the inductance of the connecting cables (to IDT 3 in FIG. 5), an impedance Z is formed in the vicinity of the serial resonance for IDT 3. When the wear element is worn together with the rider ring 7, the impedance Z for IDT 3 changes, thus also changing its acoustic reflectivity in the manner described. The high degree of measurement sensitivity is thus adjusted, such that the very steep impedance alteration is brought into play in the vicinity of the series resonance for measuring the process of wear and tear.

Figure 7:
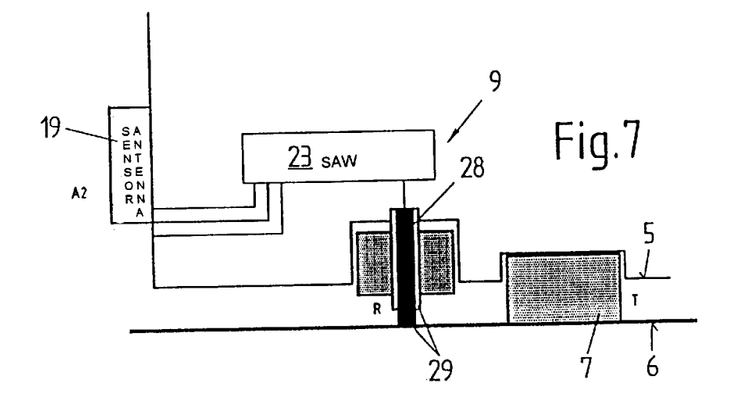

According to FIG. 7, instead of a capacitor, a variable resistance 28 is now connected to the surface acoustic wave element 23 (or IDT 3 in FIG. 5), which naturally also leads to an alteration of the reflectivity of IDT 3, yet in which no absolute reflection minimum can be achieved and the resolution of the measured dimension becomes correspondingly smaller. In addition, corresponding soft metal limit stop contacts 29 (made e.g. of copper) can be provided for alerting to the maximum permissible wear and tear.

Figure 8:
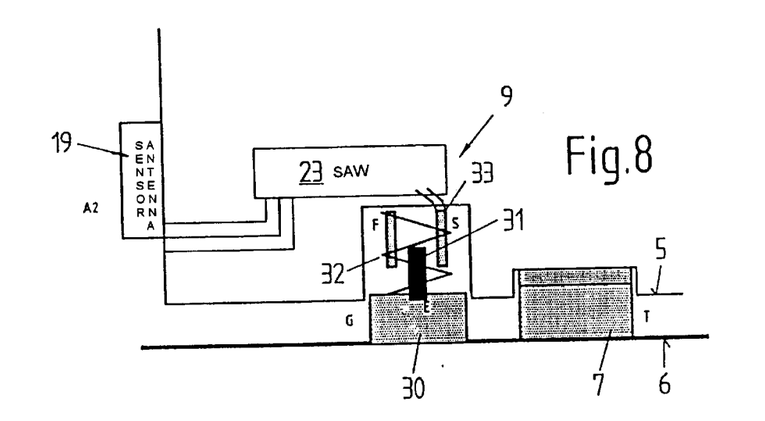

In the embodiment according to FIG. 8, a sliding block 30 subject to minimal or to no wear and tear and an iron core 31 connected thereto are provided, which sliding block 30 is pressed into a coil 33 against the force exerted by a spring 32 as the thickness of the rider ring 7 decreases, thus altering the inductance of the said coil 33, which is in turn connected to the surface acoustic wave element 23 (or its IDT 3), according to the degree of wear and tear.

Figure 9:
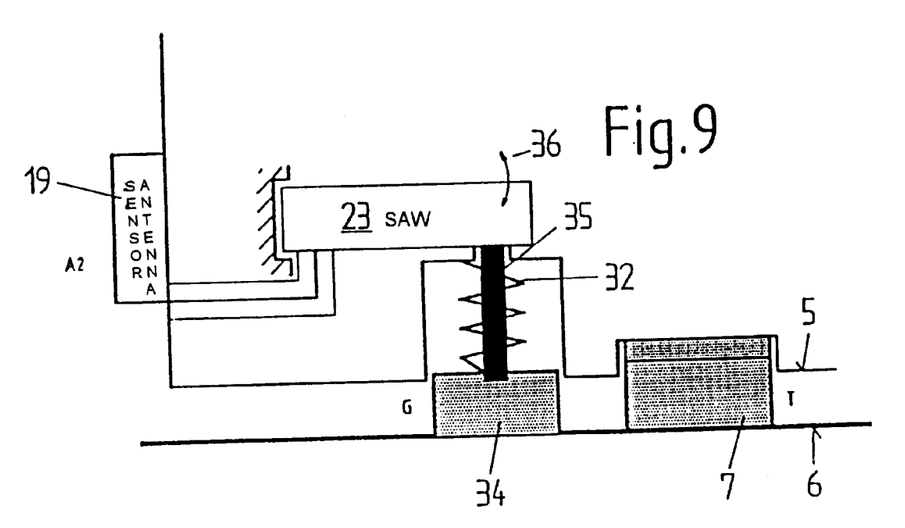

According to FIG. 9, a slide block 34 is provided, also applied to the piston 5 in the vicinity of the rider ring 7 and independent thereof, which in turn presents a degree of wear and tear that is negligible with respect to the said rider ring 7 and is guided radially by a spring 32 into a corresponding cavity on the said piston 5. By means of a mandrel 35, the slide block 34 acts upon the surface element 23 which is fixed at one end, for example at the left, in the direction of the arrow 36, such that the acoustic surface waves spreading out on the substratum of the said element 23 can be influenced in the manner described, regardless of the degree of wear and tear suffered by the said rider ring 7.

In order to be able to evaluate the amplitude of the reflected surface wave impulse determined by Z at the IDT 3 for example independently of the radio channel and of the residual transmission path, at least one further reflecting IDT (IDT 2) whose acoustic reflection behaviour is independent of the degree of wear and tear is situated on the substratum 22 according to FIG. 5. This enables the measurement effect to be determined by creating a relationship between the acoustic impulses reflected at IDT 3 and IDT 2. In addition, the temperature of the surface wave substratum 22 could also be determined from the acoustic propagation time between the individual reflections, which for example enables the temperature to be measured in the area of the attached discharge valve 12 in a very advantageous way in connection with the embodiment according to FIG. 2. This kind of temperature measurement could also be used to compensate for the effects of temperature changes on the measurement of wear and tear. Furthermore, the application of several separate surface acoustic wave elements would be equally possible, for example to determine the symmetry of the wear on the rider ring 7 or to determine separately such physical dimensions as pressure, temperature, gas composition and suchlike.

What is claimed is:

1. A wear monitor for monitoring the wear and tear in a moving component (7) relative to a motionless surface (6) and pressed and rubbing against the same, for monitoring the wear and tear of piston rings and rider rings with a sensor (9) monitoring the thickness of the moving component (7) at least indirectly, which sensor (9) communicates with an evaluation unit (18), wherein said sensor (9) is arranged in the area of said moving component (7) in such a way as to move with it and can be interrogated without contact via a motionless interrogation unit (16), which communicates with said evaluation unit (18); and wherein said sensor (9) presents a passive surface acoustic wave element (23) having an acoustic reflection behavior that depends on the thickness of said moving component (7) consequent upon the wear and tear suffered by the same and which communicates with a sensor antenna (19) moving together with it, and that said interrogation unit (16) presents an interrogation antenna (20) connected to it.

2. The wear monitor according to claim 1 for monitoring the wear and tear of plastic rider rings (7) on a piston (5) of a piston compressor, wherein the interrogation antenna (20) is situated on the inner cylinder liner or cylinder wall of the cylinder chamber (6) of said piston compressor and connected to interrogation and evaluation units (16, 18) by pressure-tight connections (21) and that the sensor antenna (19) of the surface acoustic wave element (23) is arranged on the piston (5) in such a way that it comes into direct proximity of the interrogation antenna (20) periodically by virtue of the piston movement.

3. The wear monitor according to claim 2, wherein the sensor (9) presents a wear element (24) arranged on the piston (5) in the vicinity of the rider ring (7) and independent thereof, having a degree of erodability which is equal to or slightly more than that of the rider ring (7) and having a radial thickness that can be interrogated through the surface acoustic wave element (23) and the interrogation and evaluation units (16, 18).

4. The wear monitor according to claim 3, wherein the wear element (24) forms an insulator (25) for a plate capacitor (26) linked with a reflection interdigital transformer (IDT 3) of the surface acoustic wave element (23), having a plate on the side of the piston (27) which is formed by the piston (5) or a conducting electrode of the wear element (24) and having an opposing plate formed by the conducting inner cylinder liner or cylinder wall of the cylinder chamber (6) and whose capacity determined by the distance between the two plates supplies to sensor signal via the surface acoustic wave element (23).

5. The wear monitor according to claim 3, wherein the capacity of a plate capacitor (26) together with the inductance of connecting cables forms an impedance Z in the vicinity of respective serial resonance for a reflection interdigital transformer (IDT 3).

6. The wear monitor according to claim 3, wherein the wear element (24) presents a resistance (28) that changes with the reducing thickness and a correspondingly changing inductance (33), which are related to a reflection interdigital transformer (IDT 3) of the surface acoustic wave element (23).

7. The wear monitor according to claim 2, wherein the sensor (9) presents a slide block (34) applied to the piston (5)

in the vicinity of the rider ring (7) and independent thereof, with a degree of wear and tear that is negligible with respect to said rider ring (7), which is pressed elastically against the internal wall of the cylinder (6) and acts mechanically upon the surface acoustic wave element (23).

8. The wear monitor according to claim 1, wherein the surface acoustic wave element (23), in addition to a reflection interdigital transformer (IDT 3) influenced by the dependence on the thickness, also present at least one further reflection interdigital transformer (IDT 2) whose acoustic reflection behavior is independent of the thickness of the moving component.

* * * * *